United States Patent
Kameoka et al.

(10) Patent No.: US 11,450,332 B2
(45) Date of Patent: Sep. 20, 2022

(54) AUDIO CONVERSION LEARNING DEVICE, AUDIO CONVERSION DEVICE, METHOD, AND PROGRAM

(71) Applicant: NIPPON TELEGRAPH AND TELEPHONE CORPORATION, Tokyo (JP)

(72) Inventors: Hirokazu Kameoka, Tokyo (JP); Takuhiro Kaneko, Tokyo (JP); Ko Tanaka, Tokyo (JP); Nobukatsu Hojo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/970,935

(22) PCT Filed: Feb. 20, 2019

(86) PCT No.: PCT/JP2019/006397
§ 371 (c)(1),
(2) Date: Aug. 18, 2020

(87) PCT Pub. No.: WO2019/163849
PCT Pub. Date: Aug. 29, 2019

(65) Prior Publication Data
US 2020/0395028 A1 Dec. 17, 2020

(30) Foreign Application Priority Data
Feb. 20, 2018 (JP) ................ JP2018-028294

(51) Int. Cl.
*G10L 21/007* (2013.01)
*G10L 25/03* (2013.01)
*G10L 21/013* (2013.01)

(52) U.S. Cl.
CPC ............ *G10L 21/007* (2013.01); *G10L 25/03* (2013.01); *G10L 2021/0135* (2013.01)

(58) Field of Classification Search
CPC .......... G10L 21/007; G10L 2021/0135; G10L 25/03
See application file for complete search history.

(56) References Cited

U.S. PATENT DOCUMENTS

2019/0251952 A1* 8/2019 Arik ................ G10L 13/033
2020/0184316 A1* 6/2020 Kavukcuoglu ...... G06N 3/0472

OTHER PUBLICATIONS

Nakashika, T., Takiguchi, T., & Ariki, Y. (2014). Voice conversion using RNN pre-trained by recurrent temporal restricted Boltzmann machines. IEEE/ACM Transactions on Audio, Speech, and Language Processing, 23(3), 580-587.*

(Continued)

*Primary Examiner* — Bryan S Blankenagel (57) ABSTRACT

To be able to convert to a voice of the desired attribution. Learning an encoder for, on the basis of parallel data of a sound feature vector series in a conversion-source voice signal and a latent vector series in the conversion-source voice signal, and an attribution label indicating attribution of the conversion-source voice signal, estimating a latent vector series from input of a sound feature vector series and an attribution label, and a decoder for reconfiguring the sound feature vector series from input of the latent vector series and the attribution label.

20 Claims, 6 Drawing Sheets

(56) References Cited

OTHER PUBLICATIONS

Arik, S. O., Chen, J., Peng, K., Ping, W., & Zhou, Y. (2018). Neural voice cloning with a few samples. arXiv preprint arXiv: 1802.06006.*

Hsu, C. C., Hwang, H. T., Wu, Y. C., Tsao, Y., & Wang, H. M. (Dec. 2016). Voice conversion from non-parallel corpora using variational auto-encoder. In 2016 Asia-Pacific Signal and Information Processing Association Annual Summit and Conference (APSIPA) (pp. 1-6). IEEE.*

Kinnunen, T., Juvela, L., Alku, P., & Yamagishi, J. (Mar. 2017). Non-parallel voice conversion using i-vector PLDA: Towards unifying speaker verification and transformation. In 2017 IEEE international conference on acoustics, speech and signal processing (ICASSP) (pp. 5535-5539). IEEE.*

Hsu, Chin-Cheng, et al., "Voice Conversion from Non-parallel Corpora Using Variational Auto-encoder," arXiv:1610.04019v1, Oct. 13, 2016.

Hsu, Chin-Cheng, et al., "Voice Conversion from Unaligned Corpora using Variational Autoencoding Wasserstein Generative Adversarial Networks," In-terspeech, Aug. 20, 2017, pp. 3364-3368.

\* cited by examiner

AUDIO CONVERSION LEARNING DEVICE, AUDIO CONVERSION DEVICE, METHOD, AND PROGRAM

CROSS-REFERENCE TO RELATED APPLICATIONS

This application is a U.S. 371 Application of International Patent Application No. PCT/JP2019/006397, filed on 20 Feb. 2019, which application claims priority to and the benefit of JP Application No. 2018-028294, filed on 20 Feb. 2018, the disclosures of which are hereby incorporated herein by reference in their entireties.

TECHNICAL FIELD

The present invention relates to a voice conversion learning system, voice conversion system, method, and program, and more particularly, to a voice conversion learning system, voice conversion system, method, and program for converting a voice.

BACKGROUND ART

The voice conversion is a technology for converting only a non-language/paralanguage (such as speaker individuality and utterance style) while keeping the language information (utterance sentences) in the input voice. The voice conversion can be applied to speaker individuality conversion, speech support, speech enhancement, and pronunciation conversion or the like in text speech synthesis. The problem in the voice conversion can be formulated as a problem in regression analysis in estimating the mapping function from the feature amount of the conversion-source voice to the feature amount of the conversion-target voice. Among conventional voice conversion methods, a technique using the Gaussian Mixture Model (GMM) is commonly used because of its validity and versatility. Recent studies also evaluate neural network based techniques such as the Restricted Boltzmann Machine, the Feedforward Neural Network (NN), the Recurrent NN (RNN), and the Convolutional NN (CNN), and exemplar based techniques using the Non-negative Matrix Factorization (NMF) or the like. Most of these techniques learn the conversion function so that the feature amount of the converted voice approaches the feature amount of the target voice as much as possible using parallel data. However, in some applications, it is often difficult to provide pair data of a conversion-source voice and a target voice of the same utterance content. In addition, even if the pair data can be provided, time alignment is required at high accuracy, and automatic time alignment needs visual or manual pre-screening to correct misalignment.

Meanwhile, methods have also been proposed that do not necessarily need parallel data. An example is a method using voice recognition. This method constructs the parallel data by pairing the voice feature amounts in a time frame recognized as the same phoneme in the conversion-source voice and the conversion-target voice. It is assumed that this method can do the voice recognition at extremely high accuracy, which may need a large voice corpus to learn the voice recognition itself. This may be a disadvantage in some applications. Methods specific to the task of converting the speaker individuality include a speaker adaptation technology. This method does not need to provide the parallel data of the conversion-source voice and the conversion-target voice, but needs parallel data of a reference voice to learn the speaker space. Recently studies also evaluate methods that do not need data such as a text label and reference voice, a module such as voice recognition, or parallel data at all. Among others, a method using the Conditional Variational Autoencoder (CVAE) is proposed as an effective method (NPL 1, 2).

CITATION LIST

Non Patent Literature

[NPL 1] C.-C. Hsu, H.-T. Hwang, Y.-C. Wu, Y. Tsao, and H.-M. Wang, "Voice Conversion from Non-parallel Corpora Using Variational Auto-encoder," in Proc. APSIPA, 2016, pp. 1-6.

[NPL 2] C.-C. Hsu, H.-T. Hwang, Y.-C. Wu, Y. Tsao, and H.-M. Wang, "Voice Conversion from Unaligned Corpora Using Variational Autoencoding Wasserstein Generative Adversarial Networks," in Proc. In-terspeech, 2017, pp. 3364-3368.

SUMMARY OF THE INVENTION

Technical Problem

However, as these methods independently convert each sound feature amount in each short interval of the voice, it is difficult to do conversion reflecting the context of the voice (global time dependence such as the utterance content and context) and dynamics (local time dependence).

The present invention is provided to solve the above problems and the purpose thereof is to provide a voice conversion learning system, method, and program that may learn a conversion function that may convert to a voice of the desired attribution.

Another purpose of the present invention is to provide a voice conversion system, method, and program that may convert to a voice of the desired attribution.

Means for Solving the Problem

To achieve the above purpose, a voice conversion learning system according to the present invention is configured by including a learning unit, the learning unit learning an encoder for, on the basis of parallel data of a sound feature vector series in a conversion-source voice signal and a latent vector series in the conversion-source voice signal, and an attribution label indicating attribution of the conversion-source voice signal, estimating a latent vector series from input of a sound feature vector series and an attribution label, and a decoder for reconfiguring the sound feature vector series from input of the latent vector series and the attribution label.

In addition, a voice conversion learning method according to the present invention includes: learning, by a learning unit, an encoder for, on the basis of parallel data of a sound feature vector series in a conversion-source voice signal and a latent vector series in the conversion-source voice signal, and an attribution label indicating attribution of the conversion-source voice signal, estimating a latent vector series from input of a sound feature vector series and an attribution label; and learning, by a learning unit, a decoder for reconfiguring the sound feature vector series from input of the latent vector series and the attribution label.

In addition, a voice conversion system according to the present invention is configured by including an encoder calculation unit for estimating a latent vector series from an input sound feature vector series in a conversion-source voice signal and an attribution label indicating attribution of the conversion-source voice signal by using an encoder for estimating a latent vector series from input of the sound feature vector series and the attribution label; and a decoder calculation unit for estimating a sound feature vector series of a target voice signal from the estimated latent vector series and the input attribution label indicating attribution of the target voice signal by using a decoder for reconfiguring the sound feature vector series from input of the latent vector series and the attribution label.

In addition, a voice conversion method according to the present invention includes: estimating, by an encoder calculation unit, a latent vector series from an input sound feature vector series in a conversion-source voice signal and an attribution label indicating attribution of the conversion-source voice signal by using an encoder for estimating a latent vector series from input of the sound feature vector series and the attribution label; and estimating, by a decoder calculation unit, a sound feature vector series of a target voice signal from the estimated latent vector series and the input attribution label indicating attribution of the target voice signal by using a decoder for reconfiguring the sound feature vector series from input of the latent vector series and the attribution label.

In addition, a program according to the present invention is a program for allowing a computer to function as each part in the voice conversion learning system according to the above invention or as each part in the voice conversion system according to the invention.

Effects of the Invention

A voice conversion learning system, method, and program according to the present invention provide effects of being able to learn a conversion function that may convert to a voice of the desired attribution, by learning an encoder for estimating a latent vector series from input of a sound feature vector series and an attribution label and a decoder for reconfiguring the sound feature vector series from input of the latent vector series and the attribution label.

A voice conversion system, method, and program according to the present invention may convert to a voice of the desired attribution by estimating a latent vector series from an input sound feature vector series in a conversion-source voice signal and an attribution label indicating attribution of the conversion-source voice signal by using an encoder, and estimating a sound feature vector series of a target voice signal from the estimated latent vector series and the input attribution label indicating attribution of the target voice signal by using a decoder.

BRIEF DESCRIPTION OF DRAWINGS

FIG. 5 (a) shows a mel-cepstrum coefficient matrix of an input voice.

FIG. 5 (b) shows a mel-cepstrum coefficient matrix of a converted voice when provided with an attribution label of an input voice according to a technique in an embodiment of the present invention.

FIG. 5 (c) shows a mel-cepstrum coefficient matrix of a converted voice when provided with an attribution label of a target voice according to a technique in an embodiment of the present invention.

FIG. 5 (d) shows a mel-cepstrum coefficient matrix of an input voice added with a difference of a converted voice when provided with an attribution label of a target voice.

DESCRIPTION OF EMBODIMENTS

Embodiments of the present invention will be described in more detail below with reference to the drawings.

<Overview According to Embodiments of the Present Invention>

An overview according to the embodiments of the present invention will first be described.

The embodiments of the present invention propose a parallel-data free voice conversion technique that does not need parallel data. Advantages of the method according to the embodiments of the present invention include: (1) that data such as a text label and reference voice or a module such as a voice recognition are not additionally needed; (2) that excessive smoothing of audio parameter, which is often a problem in many conventional voice conversion methods, is less likely to occur; and (3) that conversion is possible that reflects time dependence of the voice of the conversion source and target.

In addition, advantages of the method according to the embodiments of the present invention include that the input and output of the CVAE are extended to a form considering time-series data and that the networks of the encoder and decoder are achieved by modeling them using a convolutional network or a gated convolutional network.

<Principle of Embodiments of the Present Invention>
<Variational Autoencoder (VAE)>

The VAE is a probabilistic generative model of a Neural Network (NN) of an encoder and a decoder. The encoder network is an NN that for a given input data vector x, outputs a parameter of a conditional distribution q(z|x) of a latent variable vector z. The decoder network is an NN that for a given latent variable vector z, outputs a parameter of a conditional distribution p(x|z) of a data vector x. For learning data:

$$\mathcal{X} = \{x_n\}_{n=1}^{N}$$

the VAE learns the NN parameters of the encoder and decoder so that the encoder distribution q(z|x) approaches the posterior distribution p(z|x)/p(x|z)p(z) as much as possible. Jensen's inequality may provide the lower bound of the log marginal likelihood (evidence) log p(x).

[Formula 1]

$$\log p(x) = \log \int p(x, z)dz \qquad (1)$$
$$= \log \int q(z|x) \frac{p(x|z)p(z)}{q(z|x)}$$

-continued $$\geq \int q(z\mid x)\log\frac{p(x\mid z)p(z)}{q(z\mid x)}$$

$$= \mathbb{E}_{z\sim q(z\mid x)}[\log\, p(x\mid z)] - KL[q(z\mid x)\,\|\, p(z)]$$

The difference between the left and right sides of Formula (1) equals the Kullback-Leibler (KL) divergence KL [q(z|x) ‖p(z|x)] of q(z|x) and p(z|x), and is minimal at:
[Formula 2]

$$q(z|x) = p(z|x) \quad (2)$$

Therefore, increasing the right side of Formula (1) corresponds to approximating q(z|x) and p(z|x)∝p(x|z)p(z). Assuming here that $\mu_\varphi(x)$ and $\log \sigma^2_\varphi(x)$ are outputs of the encoder network of parameter φ, $\mu_\varphi(z)$ and $\log \sigma^2_\theta(z)$ are outputs of the decoder network of parameter θ, q(z|x) and p(x|z) are normal distributions with those as an average and dispersion, respectively, and p(z) is the standard normal distribution,
[Formula 3]

$$q(z|x) = \mathcal{N}(z|\mu_\varphi(x), \mathrm{diag}(\sigma_\varphi^2(x))) \quad (3)$$

$$p(z|x) = \mathcal{N}(x|\mu_\theta(z), \mathrm{diag}(\sigma_\theta^2(z))) \quad (4)$$

$$p(z) = \mathcal{N}(z|0, I) \quad (5)$$

then, the first term on the right side of Formula (1) can be written as:

[Formula 4]

$$\mathbb{E}_{z\sim q(z|x)}[\log p(x|z)] =$$

$$\mathbb{E}_{\epsilon\sim\mathcal{N}(\epsilon|0,I)}\left[-\frac{1}{2}\sum_i \log 2\pi[\sigma_\theta^2(\mu_\varphi(x)+\sigma_\varphi(x)\odot\epsilon)]_i - \right.$$

$$\left.\sum_i \frac{(x_i - [\mu_\theta(\mu_\varphi(x)+\sigma_\varphi(x)\odot\epsilon)]_i)^2}{2[\sigma_\theta^2(\mu_\varphi(x)+\sigma_\varphi(x)\odot\epsilon)]_i}\right] \quad (6)$$

Here, a fact is used that z~q (z|x) can be variable-changed through the relational Formula $$z = \mu_\varphi(x) + \sigma_\varphi(x) \odot \epsilon$$

to $$\epsilon \sim \mathcal{N}(\epsilon|0, I)$$

where ⊙ represents the product of each element. It can be understood that Formula (6) is a negative weighted square error of x and $\mu_\theta(\mu_\varphi(x))$, if the random term derived from ε is ignored. This is the origin of the name Probabilistic Variational Autoencoder (VAE). In addition, the second term on the right side of Formula (1) is given as a negative KL divergence of q(z|x) and p(z)=N(z|0, I). The second term works as a regularization term that forces each element in the output of the encoder network to act independently and according to the normal distribution.

The Conditional VAE (CVAE) is an extended VAE in which an auxiliary variable y may be input to the encoder and decoder, as follows:
[Formula 5]

$$q(z|x,y) = \mathcal{N}(z|\mu_\varphi(x,y), \mathrm{diag}(\sigma_\varphi^2(x,y))) \quad (7)$$

$$p(z|x,y) = \mathcal{N}(x|\mu_\theta(x,y), \mathrm{diag}(\sigma_\theta^2(x,y))) \quad (8)$$

Then, the purpose function to be maximized is as follows:
[Formula 6]

$$\mathcal{J}(\varphi,\theta) = \mathbb{E}_{z\sim q(z|x,y)}[\log p(x|z,y)] - KL[q(z|x,y)\|p(z)] \quad (9)$$

<Description of the Embodiments of the Present Invention>

<Voice Conversion by CVAE (Conventional Method)>

For $$x \in \mathbb{R}^D$$

as a sound feature (such as the mel-cepstrum coefficient) vector and y as a one-hot vector corresponding to an attribution label, the problem in the parallel-data free voice conversion may be formulated by CVAE (NPL 1, 2). For learning data as $\{x_n, y_n\}^N_{n=1}$, the encoder learns a function that converts the sound feature vector $x_n$ to the latent variable vector $z_n$ according to the attribution label y, and the decoder learns a function that reconfigures the sound feature vector $\hat{x}_n$ from the latent variable vector $z_n$ according to the attribution label y. After the learning is completed, the sound feature vector of the conversion-source voice may be input to the encoder and the target attribution label may be input to the decoder to reconfigure the sound feature vector, thus converting the sound feature vector.

<Voice Conversion by Sequence-to-Sequence CVAE (Method According to an Embodiment of the Present Invention)>

A voice has different ways of speaking and voice changing depending on the context and utterance content. Therefore, it is preferable that a function for converting the sound feature vector has time dependence (i.e., the function is determined depending on the historical record of the sound feature vector series of the input and output voices). However, as the above method converts the sound feature vector independently for each frame, the method is not a conversion method that reflects the time-dependent relationship of the sound feature vector series. Then, an embodiment of the present invention extends the input and output of the CVAE to a form assuming time-series data so that a conversion may be possible that reflects the time dependence of the sound feature vector of the voice. Specifically, the networks of the encoder and decoder are modeled by the convolutional network or the gated convolutional network.

The sound feature vector series of an utterance j is given as $X_j = [x_1, \ldots, x_{N_j}] \in \mathbb{R}^{D\times N_j}$ and the attribution label as $y_j$. For learning data as $\{X_j, y_j\}^J_{j=1}$, the encoder learns a function for converting, for each utterance j, the sound feature vector series $X_j$ to the latent variable vector series $Z_j = [z_1, \ldots, z_{N_j}^Z] \in \mathbb{R}^{D_z \times N_{z_j}}$ according to the attribution label $y_j$, and the decoder learns a function reconfiguring the sound feature vector series $\hat{X}_j$ from the latent variable vector series $Z_j$ according to the attribution label $y_j$. After the learning is completed, the sound feature vector series of the utterance of the conversion source attribution may be input to the encoder and the target attribution label may be input to the decoder to reconfigure the sound feature vector series, thus converting the sound feature vector series at a stroke.

The network structures of the encoder and decoder may include, for example, the Convolutional Neural Network (CNN) and the Recurrent NN (RNN).

The CNN is a two-dimensional CNN if the $X_j$ is considered as a one channel image having a size of $D \times N_j$ and is a one-dimensional CNN if the $X_j$ is considered as a D channel image having a size of $1 \times N_j$. In addition, the gated CNN may be included as a subspecies of the CNN and the Long Short-Term Memory (LSTM) may be included as a subspecies of the RNN. The gated CNN is first and originally introduced as a predictive model of a word string. It is reported that the gated CNN provides a word prediction performance exceeding the LSTM in an experiment at the same condition. For the output of the lth layer as $H_l$, the gated CNN gives the $H_l$ as:
[Formula 7]

$$H_l = (W_l * H_{l-1} + B_l) \odot \sigma(V_l * H_{l-1} + C_l) \quad (10)$$

Where σ represents a sigmoid function for each element and the parameters to be estimated are $W_l \in R^{Dl \times Dl-1} \times N^W_l$, $B_l \in R^{Dl \times Nb}_{j,l}$, $V_l \in R^{Dl \times Dl-1 \times Nv}_l$, and $C_l \in R^{Dl \times Nc}_{j,l}$. They may be represented for each element as follows:

[Formula 8]

$$h_{l,d,n} = \left( \sum_{d'} \sum_{n'} \omega_{l,d,d',n-n'} h_{l-1,d',n'} + b_{l,d,n} \right) \cdot$$

$$\sigma\left( \sum_{d'} \sum_{n'} v_{l,d,d'}, n-n', h_{l-1,d',n'} + c_{l,d,n} \right) \quad (11)$$

For the output layers (the Lth layers) of the encoder and decoder, for example, linear layers may be used as follows.
[Formula 9]

$$\mu_\phi(X_j) = W_L * H_{L-1} + B_L \quad (12)$$

$$\log \sigma_\phi^2(X_j) = V_L * H_{L-1} + C_L \quad (13)$$

$$\mu_\theta(Z_j) = W'_L * H'_{L-1} + B'_L \quad (14)$$

$$\log \sigma_\theta^2(Z_j) = V'_L * H'_{L-1} C'_L \quad (15)$$

<Conversion Method (Method According to an Embodiment of the Present Invention)>

The sound feature vector includes,
(A1) a vector having a logarithmic amplitude spectrum as an element,
(A2) a vector having a mel-cepstrum coefficient as an element,
(A3) a vector having a linear predictive coefficient as an element,
(A4) a vector having a Partial Correlation (PARCOR) coefficient as an element, and
(A5) a vector having a Line Spectral Pair (LSP) parameter as an element.

(A1) may be obtained by time-frequency analysis such as the SIFT and wavelet transform, (A2) by the mel-cepstrum analysis, (A3) by the linear predictive analysis, (A4) by the PARCOR analysis, and (A5) by the LSP analysis. In addition, (A1) may be a spectrum envelope obtained by the STRAIGHT analysis, the WORLD analysis or the like, and (A2-A5) may be obtained from the spectrum envelope by applying the respective analyses thereto. For example, the following (B1-B5) may be used as the sound feature vector.
(B1) A vector having a log-spectrum envelope as an element,
(B2) a vector having a mel-cepstrum coefficient from B1 as an element,
(B3) a vector having a linear predictive coefficient from B1 as an element,
(B4) a vector having a PARCOR coefficient from B1 as an element, and
(B5) a vector having an LSP parameter from B1 as an element.

After learning of φ and θ is complete, the attribution label of the input voice y and the sound feature vector series X may be input to the encoder and the output of the encoder and the target attribution label y' may be input to the decoder, thus obtaining the sound feature vector series $\hat{X}$ of the converted voice. This process may be represented as follows:
[Formula 10]

$$\hat{X} = \mu_\theta(\mu_\phi(X,y), y') \quad (16)$$

The $\hat{X}$ thus obtained may provide the time domain signal, which may provide the converted voice. This may be achieved by inverse transform of the time-frequency analysis (such as the reverse STFT and wavelet inverse transform) for (A1) as the sound feature vector and by a vocoder for (A2)-(A5) and (B1)-(B5). As the $\hat{X}$ thus obtained tends to be excessively smoothed, the following method may be used.

First,
[Formula 11]

$$\tilde{X} = \mu_\theta(\mu_\phi(X,y), y) \quad (17)$$

may be used to obtain the reconfigured sound feature vector series of the input voice. The $\tilde{X}$ thus obtained may also be excessively smoothed. Using this fact, a spectrum gain series may be calculated from the $\hat{X}$ and $\tilde{X}$, and then may be multiplied to the spectrum series or spectrum envelope series of the input voice for each frame, thus obtaining the spectrum series or spectrum envelope series of the converted voice. In addition, the spectrum gain of each frame may be converted to the time domain to obtain an impulse response and then the impulse response may be convoluted to the time domain signal of the input voice for each frame, thus directly obtaining the time domain signal of the converted voice.

<Configuration of Voice Conversion Learning System According to an Embodiment of the Present Invention>

Figure 1:
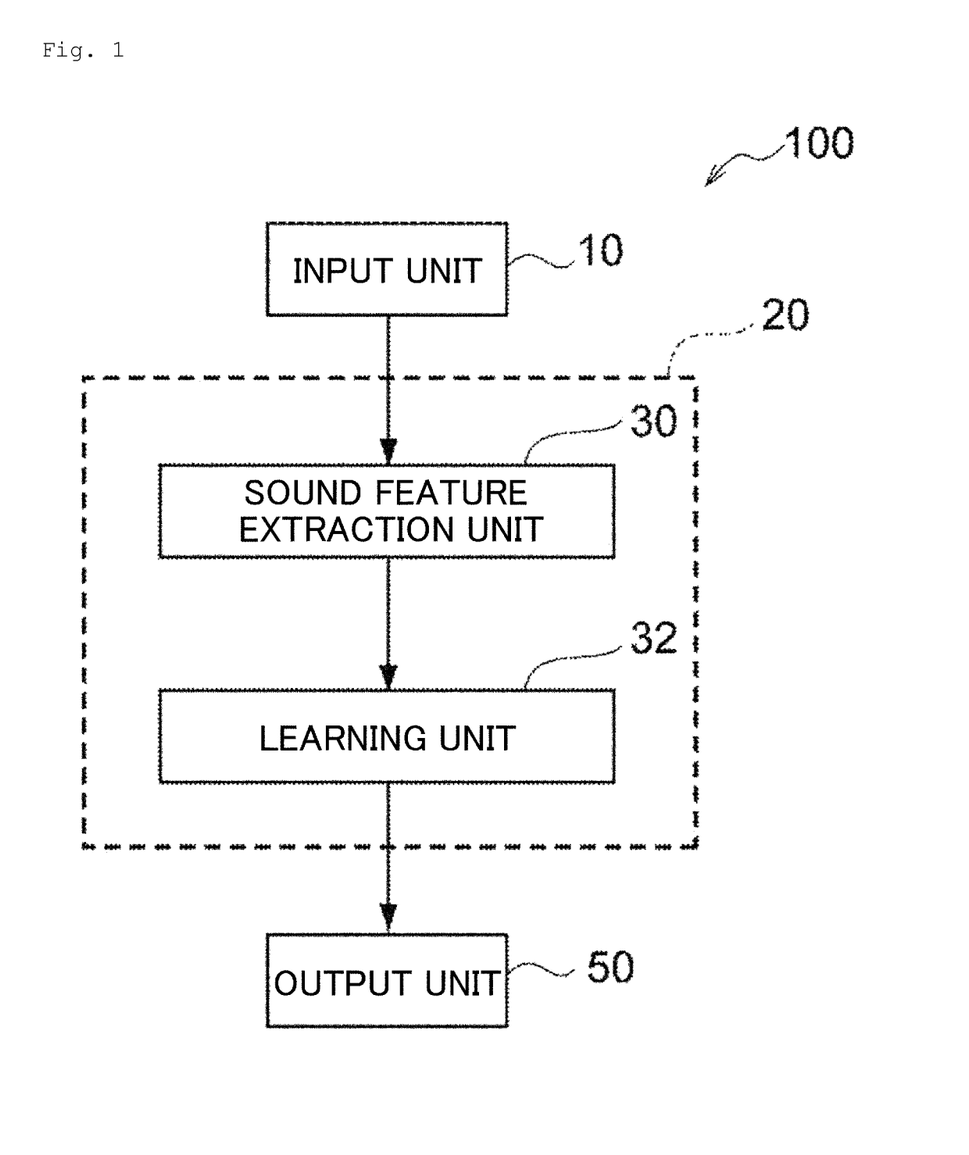
FIG. 1 is a block diagram showing a configuration of a voice conversion learning system according to an embodiment of the present invention.

A description will now be given of the configuration of the voice conversion learning system according to an embodiment of the present invention. As shown in FIG. 1, the voice conversion learning system 100 according to the embodiment of the present invention may be configured by a computer including a CPU, a RAM, and a ROM that stores a program and various data for performing a voice conversion learning process routine described below. The voice conversion learning system 100 includes, from a functional point of view, an input unit 10, an operation unit 20, and an output unit 50, as shown in FIG. 1.

The input unit 10 receives, parallel data of a conversion-source voice signal and a latent vector series in the conversion-source voice signal, and an attribution label indicating attribution of the conversion-source voice signal. Note that the attribution label indicating the attribution of the conversion-source voice signal may be provided manually. In addition, the attribution of the voice signal includes, for example, gender, adults/children, speaker ID, whether native speaker or not (national origin), the type of utterance mood (such as anger and sadness), and utterance mode (such as lecture-like and free utterance-like).

the operation unit 20 is configured by including a sound feature extraction unit 30 and a learning unit 32.

The sound feature extraction unit 30 extracts sound feature vector series from the input conversion-source voice signal.

The learning unit 32 learns the encoder and decoder on the basis of parallel data of the sound feature vector series in the conversion-source voice signal and the latent vector series in the conversion-source voice signal, and the attribution label indicating the attribution of the conversion-source voice signal. The encoder estimates the latent vector series from input of the sound feature vector series and the attribution label. The decoder reconfigures the sound feature vector series from input of the latent vector series and the attribution label.

Specifically, the learning unit 32 learns the encoder and decoder to maximize the value of the purpose function of above Formula (9) and outputs to the output unit 50. The purpose function is represented using an error between the sound feature vector series reconfigured by the decoder and the sound feature vector series in the conversion-source voice signal in the parallel data, as well as a distance between the latent vector series estimated by the encoder and the latent vector series in the conversion-source voice signal in the parallel data. Here, the encoder and decoder are configured using the convolutional network or the recurrent network.

For example, the encoder and decoder are configured using the gated CNN and the output $H_l$ of each convolution layer is expressed by Formula (10).

<Configuration of Voice Conversion System According to an Embodiment of the Present Invention>

Figure 2:
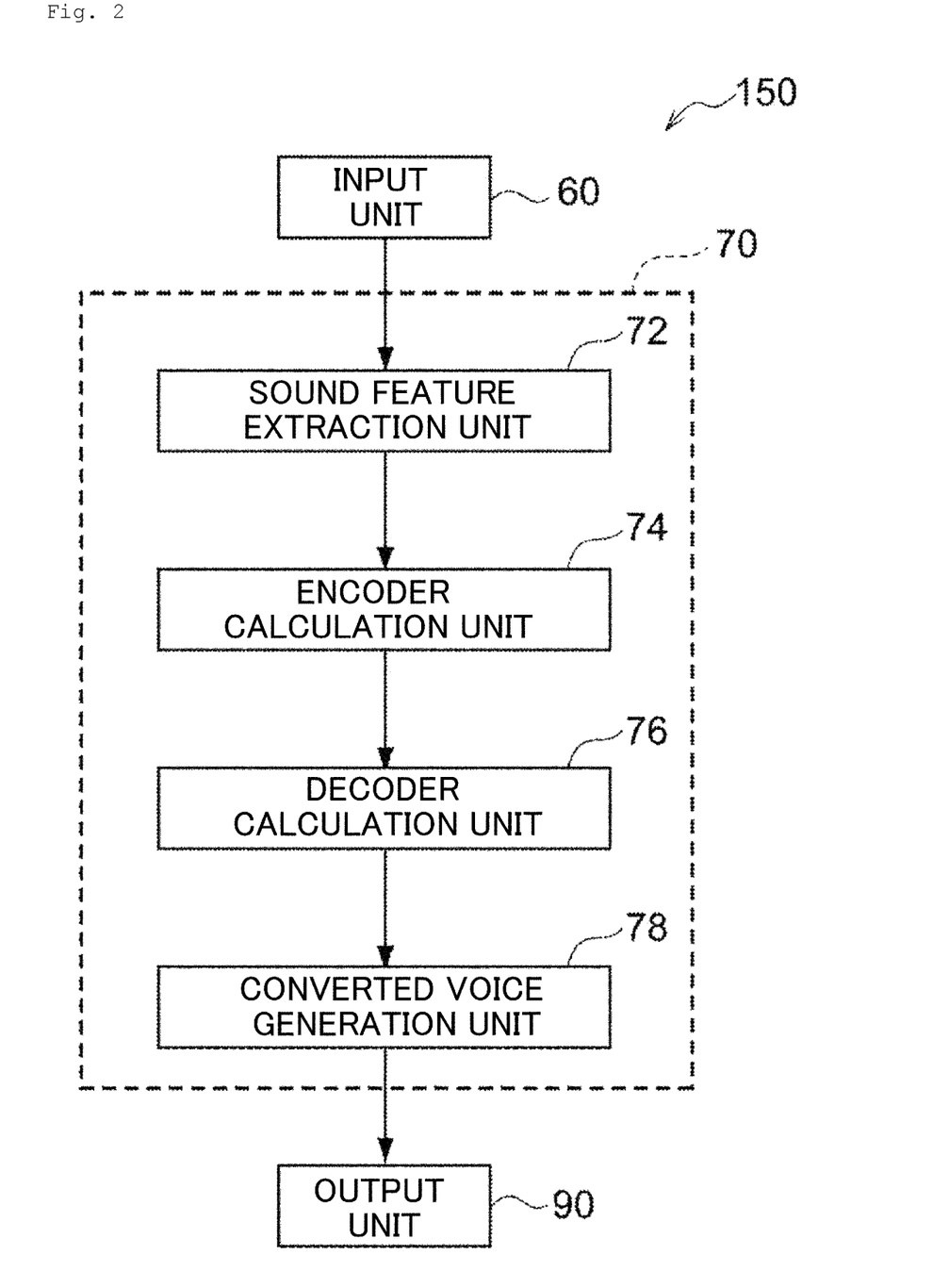
FIG. 2 is a block diagram showing a configuration of a voice conversion system according to an embodiment of the present invention.

A description will now be given of a configuration of a voice conversion system according to an embodiment of the present invention. As shown in FIG. 2, a voice conversion system 150 according to the embodiment of the present invention may be configured by a computer including a CPU, a RAM, and a ROM that stores a program and various data for performing a voice conversion process routine described below. The voice conversion system 150 includes, from a functional point of view, an output unit 90, an operation unit 70, and an input unit 60, as shown in FIG. 2.

The input unit 60 receives, as input, the conversion-source voice signal, the attribution label indicating the attribution of the conversion-source voice signal, and an attribution label indicating attribution of a target voice signal. Note that the attribution label indicating the attribution of the conversion-source voice signal and the attribution label indicating the attribution of the target voice signal may be provided manually. In addition, the attribution label indicating the attribution of the conversion-source voice signal may be extracted automatically from the conversion-source voice signal.

The operation unit 70 is configured by including a sound feature extraction unit 72, an encoder calculation unit 74, a decoder calculation unit 76, and a converted voice generation unit 78.

The sound feature extraction unit 72 extracts the sound feature vector series from the input conversion-source voice signal.

The encoder calculation unit 74 estimates, using the encoder learned by the voice conversion learning system 100, the latent vector series from the sound feature vector series extracted by the sound feature extraction unit 72 and the attribution label received by the input unit 60.

The decoder calculation unit 76 estimates, using the decoder learned by the voice conversion learning system 100, the sound feature vector series of the target voice signal from the estimated latent vector series and the input attribution label indicating the attribution of the target voice signal.

The converted voice generation unit 78 generates a time domain signal from the estimated sound feature vector series of the target voice signal and outputs the time domain signal to the output unit 90 as the target voice signal.

<Operation of Voice Conversion Learning System According to an Embodiment of the Present Invention>

Figure 3:
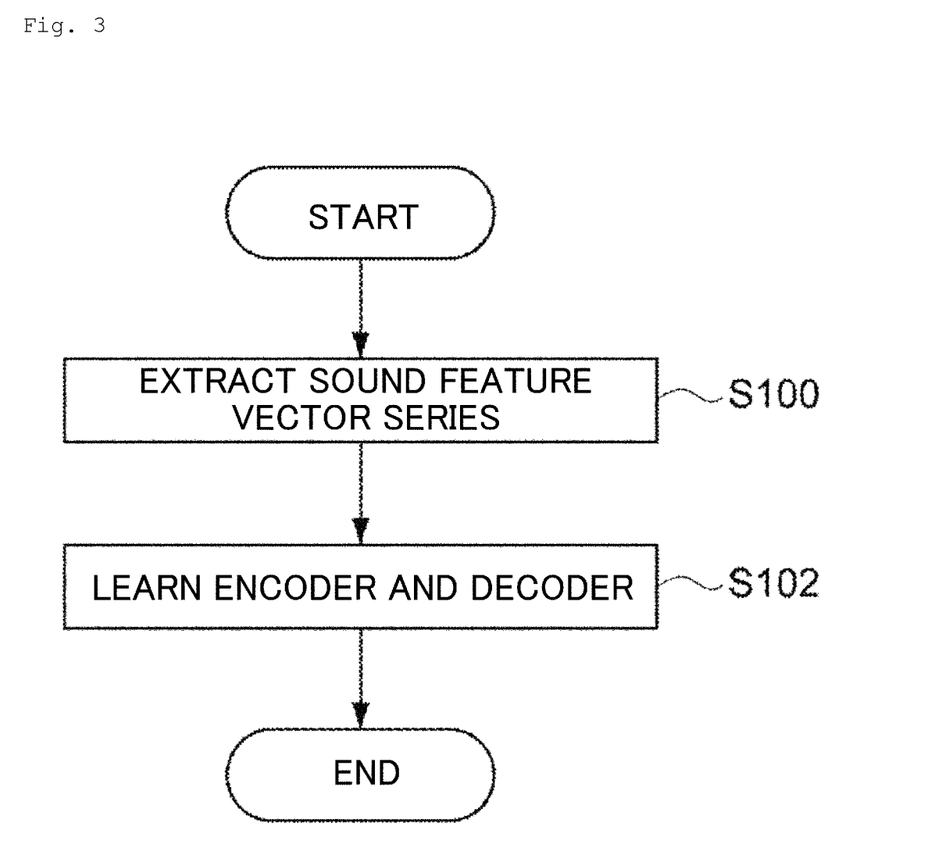
FIG. 3 is a flowchart showing a voice conversion learning process routine in a voice conversion learning system according to an embodiment of the present invention.

A description will now be given of an operation of a voice conversion learning system 100 according to an embodiment of the present invention. As the input unit 10 receives the parallel data of the conversion-source voice signal and the latent vector series in the conversion-source voice signal as well as the attribution label indicating the attribution of the conversion-source voice signal, the voice conversion learning system 100 performs the voice conversion learning process routine as shown in FIG. 3.

First, at step S100, the sound feature vector series is extracted from the input conversion-source voice signal.

Next, at step S102, on the basis of the parallel data of the sound feature vector series in the conversion-source voice signal and the latent vector series in the conversion-source voice signal as well as the attribution label indicating the attribution of the conversion-source voice signal, the encoder and decoder are learned, and the learning results are output by the output unit 50. The voice conversion learning process routine is then ended.

<Operation of Voice Conversion System According to an Embodiment of the Present Invention>

Figure 4:
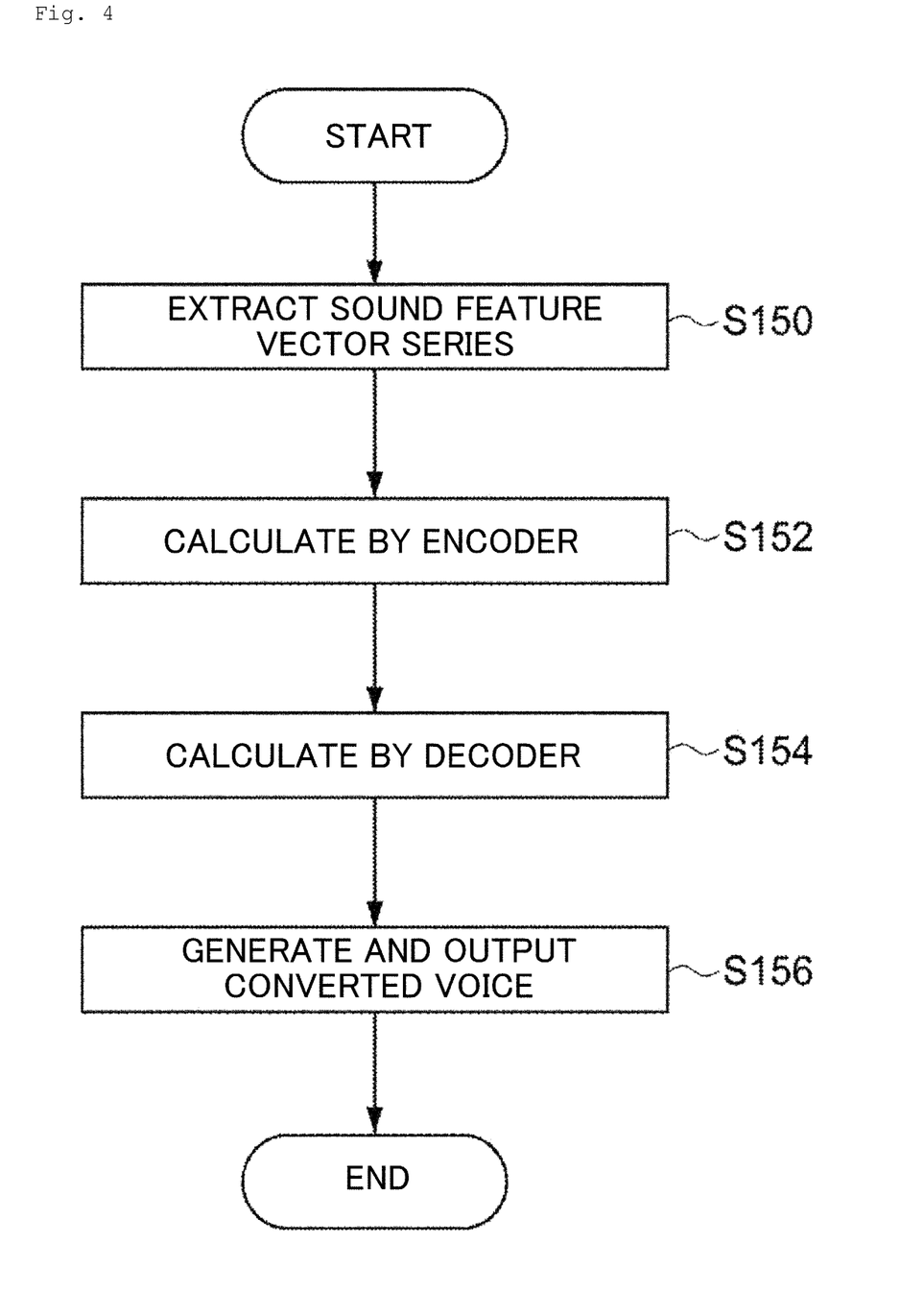
FIG. 4 is a flowchart showing a voice conversion process routine in a voice conversion system according to an embodiment of the present invention.

A description will now be given of an operation of the voice conversion system 150 according to an embodiment of the present invention. The input unit 60 receives the learning results by the voice conversion learning system 100. In addition, as the input unit 60 receives the conversion-source voice signal, the attribution label indicating the attribution of the conversion-source voice signal, and the attribution label indicating the attribution of the target voice signal, the voice conversion system 150 performs the voice conversion process routine as shown in FIG. 4.

First, at step S150, the sound feature vector series is extracted from the input conversion-source voice signal.

Next, at step S152, the latent vector series is estimated from the sound feature vector series extracted by the sound feature extraction unit 72 and the attribution label received by the input unit 60, using the encoder learned by the voice conversion learning system 100.

Next, at step S154, the sound feature vector series of the target voice signal is estimated from the estimated latent vector series and the input attribution label indicating the attribution of the target voice signal, using the decoder learned by the voice conversion learning system 100.

At step S156, the time domain signal is generated from the estimated sound feature vector series of the target voice signal and is output to the output unit 90 as the target voice signal. The voice conversion process routine is then ended.

<Experimental Results>

To demonstrate the sound quality of the voice conversion and the conversion effect according to the technique of the embodiments of the present invention, a voice conversion experiment was performed using voice data (female speaker SF1 and female speaker TF2) of Voice Conversion Challenge (VCC) 2016. Of experiment data of 216 sentences, 162 sentences were learning data and 84 sentences were test data. The sampling frequency for all voice signals was 16 kHz. For each utterance, the WORLD analysis was used to extract the spectrum envelope, the basic frequency (F0), and the non-periodicity index. The extracted spectrum envelope series was then subjected to the 26th mel-cepstrum analysis. For $F_0$, the average $m_{SF1}$ and standard deviation $d_{TF2}$ of the log $F_0$ were calculated from data of the conversion-target voice, the log average $m_{SF1}$ and standard deviation $d_{SF1}$ of the $F_0$ were calculated from data of the conversion-source voice, and the log $F_0$ pattern y(0), . . . , y(N−1) of the input voice was converted as follows:

[Formula 12]

$$\hat{y}(n) = \frac{d_{TF2}}{d_{SF1}}(y(n) - m_{SF1}) + m_{TF2} \quad (18)$$

The network configurations of the encoder and decoder are shown in table 1. "convolution, 32ch, 1×12, ↓2, GLU" represent the layer type, the number of filters, the filter size, the stride, and the type of activation function, respectively. In addition, N is the number of frames in the input series.

TABLE 1

| Encoder (Input: (26 + 2)ch, 1 × N, Output: (2 × 5)ch, 1 × N/8) |
|---|
| convolution, 32ch, 1 × 12, ↓ 2, GLU |
| convolution, 32ch, 1 × 12, ↓ 2, GLU |
| convolution, 10ch, 1 × 12, ↓ 2, Linear |
| Decoder (Input: (5 + 2)ch, 1 × N/8, Output: 26ch, 1 × N) |
| convolution, 32ch, 1 × 12, ↑ 2, GLU |
| convolution, 32ch, 1 × 12, ↑ 2, GLU |
| convolution, 26ch, 1 × 12, ↑ 2, Linear |

The sound quality and conversion effect were rated by ABX test with A and B being the converted voices from the conventional method (the method in NPL 3) and the proposed method (the method according to the embodiments of the present invention), and X being the real voice of the conversion target.

[NPL 3] T. Toda, A. W. Black, and K. Tokuda, "Voice Conversion Based on Maximum Likelihood Estimation of Spectral Parameter Trajectory," IEEE/ACM Trans. Audio Speech Lang. Process., vol. 15, no. 8, pp. 2222-2235, 2007.

Each of six subjects was indicated with 10 utterances for each of A, B, and X. The subjects were then let to select A, B, or "equivalent" for each utterance. Note that as the conventional method is for use of parallel data, the learning was done in the advantageous condition that the conventional method was provided with parallel data. The experimental results are shown in table 2 and FIG. 6.

TABLE 2

|  | proposed method | equivalent | conventional method | p-value |
|---|---|---|---|---|
| degree of sound quality | 96 ± 5.6 | 4 | 0 | 1.43e−21 |
| similarity to target speaker | 42 ± 14.2 | 36 | 22 | 0.262 |

Figure 5:
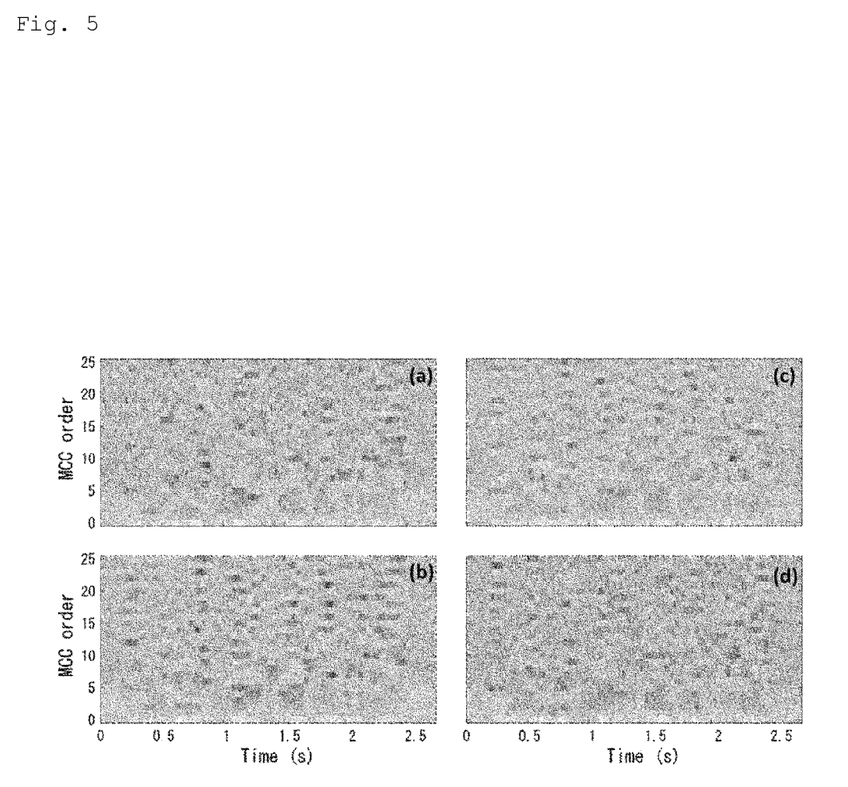
Figure 6:
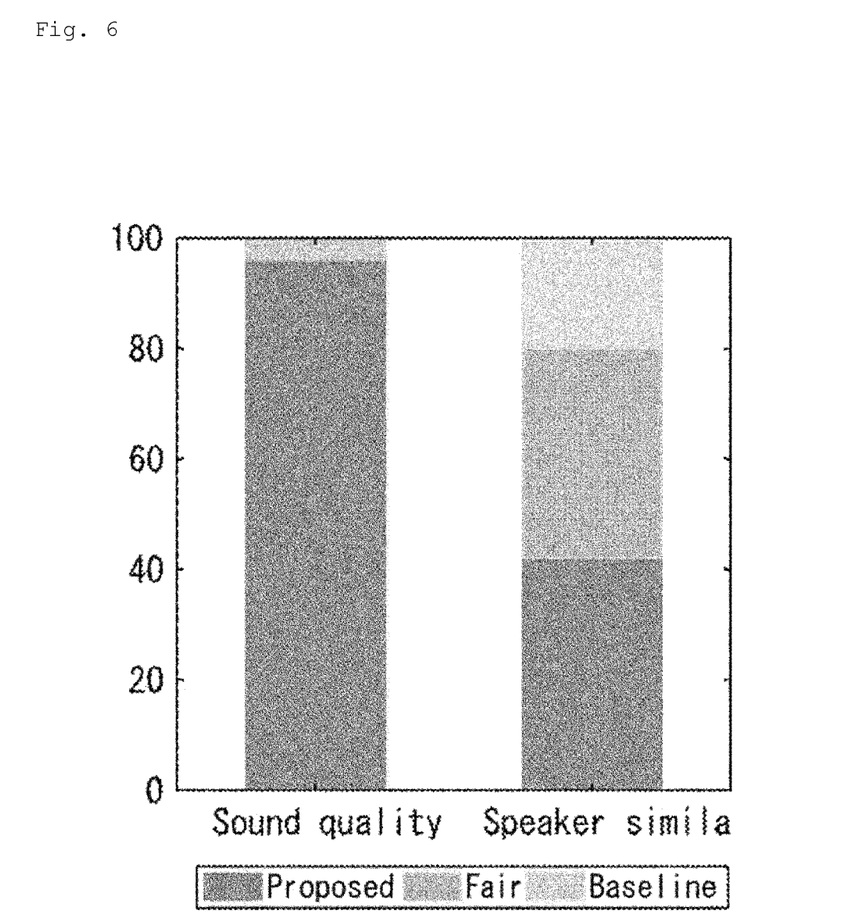
FIG. 6 shows experimental results.

Table 2 and FIG. 6 show that the proposed method is advantage for the sound quality and that the proposed and conventional methods are equivalent with respect to the similarity of the converted voice to the target speaker. This is a notable result regardless of the fact that it was obtained in a disadvantageous learning condition. FIG. 5 shows examples of the mel-cepstrum coefficient series of the input voice and the converted voice by the proposed method.

As described above, the voice conversion learning system according to an embodiment of the present invention may learn a conversion function that may convert to a voice of the desired attribution, by learning an encoder for estimating latent vector series from input of a sound feature vector series and an attribution label, and a decoder for reconfiguring the sound feature vector series from input of the latent vector series and the attribution label.

In addition, the voice conversion system according to an embodiment of the present invention may convert to a voice of the desired attribution by estimating, by an encoder, a latent vector series from the input sound feature vector series in a conversion-source voice signal and an attribution label indicating attribution of the conversion-source voice signal, and estimating, by a decoder, a sound feature vector series of a target voice signal from the estimated latent vector series and the input attribution label indicating the attribution of the target voice signal.

Note that the present invention is not limited to the above embodiments and various modifications and application may be made without departing from the spirit of the present invention.

For example, although in the above embodiments, the voice conversion learning system and voice conversion system are configured as distinct systems, they may be configured as one system.

In addition, while the above voice conversion learning system and voice conversion system include a computer system therein, the "computer system" is defined to include a website providing environment (or a display environment) as long as it uses the WWW system.

In addition, although the specification of the present application describes embodiments in which a program is previously installed, the relevant program may be provided after being stored in a computer-readable storage medium.

REFERENCE SIGNS LIST

10 input unit
20 operation unit
30 sound feature extraction unit
32 learning unit
50 output unit
60 input unit
70 operation unit
72 sound feature extraction unit
74 encoder calculation unit
76 decoder calculation unit
78 converted voice generation unit
90 output unit
100 voice conversion learning system
150 voice conversion system

The invention claimed is:

1. A computer-implemented method for converting aspects of voice, the method comprising:
  receiving conversation source data, wherein the conversation source data includes a plurality of utterances, and wherein each utterance includes a plurality of frames of voice data;
  generating a series of sound feature vectors based on the received conversation source data, wherein the series of sound feature vectors includes a sound feature vector corresponding to the utterance in the conversation source data;
  identifying a series of latent vectors based on the received conversation source data, wherein the series of latent vectors includes a latent vector corresponding to the utterance in the conversation source data;
  determining an attribution label associated with the utterance in the conversation source data;

generating an encoder based on training, wherein the training is based on a combination of the determined attribution label, the identified series of latent vectors associated with the received conversation source data, and the generated series of sound feature vectors associated with the received conversation source data;

generating a decoder based on training, wherein the training is based on a combination of the determined attribution label, the identified series of latent vectors associated with the received conversation source data, and the series of sound feature vectors associated with the received conversation source data;

receiving an input utterance;

receiving a target attribution label;

reconstructing, based on a combination of the trained encoder and the trained decoder, a series of input sound feature vectors of the input utterance by estimating, using the trained encoder, a series of output latent vectors from input latent vectors according to the target attribution label and by estimating, using the trained decoder, a series of target sound feature vectors based on the estimated series of output latent vectors and the target attribution label; and generating a target utterance based on the reconstructed series of input sound feature vectors; and providing the target utterance with the target attribution label.

2. The computer-implemented method of claim 1, the method further comprising:

generating the encoder and the decoder based on maximizing a value of an objective function,
wherein the objective function at least relates to an error between the reconstructed series of input sound feature vectors and the generated series of sound feature vector, and
wherein the objective function further relates to a distance between the determined series of output latent vectors and the identified series of latent vectors.

3. The computer-implemented method of claim 1, wherein each of the encoder and the decoder is configured using one of: a convolutional network or a recurrent network.

4. The computer-implemented method of claim 1, wherein the attribution label of the utterance in the conversation source data includes one or more of:
gender of a speaker,
a status of the speaker being a native speaker of a language used,
a type of utterance mood of the speaker, or
a style of utterance in lecture or non-lecture.

5. The computer-implemented method of claim 1, wherein each sound features vector is based on one of:
a logarithmic amplitude spectrum;
a mel-cepstrum coefficient;
a linear predictive coefficient;
a Partial Correlation (PARCOR) coefficient; or
a Line Spectral Pair (LSP) parameter.

6. The computer-implemented method of claim 1, the method further comprising:
receiving the input utterance for a conversion of sound quality; and
extracting the series of input sound feature vectors from the input utterance.

7. The computer-implemented method of claim 6, wherein the generated target utterance relates to converting non-language aspects of the input utterance while maintaining utterance sentences in the input utterance, and wherein the non-language aspects of the input utterance include one or more of individuality and an utterance style of a speaker.

8. A system for converting aspects of voice, the system comprises:
a processor; and
a memory storing computer-executable instructions that when executed by the processor cause the system to:
receive conversation source data, wherein the conversation source data includes a plurality of utterances, and wherein each utterance includes a plurality of frames of voice data;
generate a series of sound feature vectors based on the received conversation source data, wherein the series of sound feature vectors includes a sound feature vector corresponding to the utterance in the conversation source data;
identify a series of latent vectors based on the received conversation source data, wherein the series of latent vectors includes a latent vector corresponding to the utterance in the conversation source data;
determine an attribution label associated with the utterance in the conversation source data;
generate an encoder based on training, wherein the training is based on a combination of the determined attribution label, the identified series of latent vectors associated with the received conversation source data, and the generated series of sound feature vectors associated with the received conversation source data;
generate a decoder based on training, wherein the training is based on a combination of the determined attribution label, the series of latent vectors associated with the received conversation source data, and the series of sound feature vectors associated with the received conversation source data;
receive an input utterance;
receive a target attribution label;
reconstruct, based on a combination of the trained encoder and the trained decoder, a series of input sound feature vectors of the input utterance by estimating, using the trained encoder, a series of output latent vectors from intent latent vectors according to the target attribution label and by estimating, using the trained decoder, a series of the target sound feature vectors based on the estimated series of output latent vectors and the target attribution label;
generate a target utterance based on the reconstructed series of input sound feature vectors; and
provide the target utterance with the target attribution label.

9. The system of claim 8, the computer-executable instructions when executed further causing the system to:
generate the encoder and the decoder based on maximizing a value of an objective function,
wherein the objective function at least relates to an error between the reconstructed series of input sound feature vectors and the generated series of sound feature vector, and
wherein the objective function further relates to a distance between the determined series of output latent vectors and the identified series of latent vectors.

10. The system of claim 8, wherein each of the encoder and the decoder is configured using one of: a convolutional network or a recurrent network.

11. The system of claim 8, wherein the attribution label of the utterance in the conversation source data includes one or more of:
 gender of a speaker,
 a status of the speaker being a native speaker of a language used,
 a type of utterance mood of the speaker, or
 a style of utterance in lecture or non-lecture.

12. The system of claim 8, wherein each sound features vector is based on one of:
 a logarithmic amplitude spectrum;
 a mel-cepstrum coefficient;
 a linear predictive coefficient;
 a Partial Correlation (PARCOR) coefficient; or
 a Line Spectral Pair (LSP) parameter.

13. The system of claim 8, the computer-executable instructions when executed further causing the system to:
 receive the input utterance for conversion;
 extract the series of input sound feature vectors from the input utterance.

14. The system of claim 13, wherein the generated target utterance relates to converting non-language aspects of the input utterance while maintaining utterance sentences in the input utterance, and wherein the non-language aspects of the input utterance include one or more of individuality and an utterance style of a speaker.

15. A computer-readable non-transitory recording medium storing computer-executable instructions that when executed by a processor cause a computer system to:
 receive conversation source data, wherein the conversation source data includes a plurality of utterances, and wherein each utterance includes a plurality of frames of voice data;
 generate a series of sound feature vectors based on the received conversation source data, wherein the series of sound feature vectors includes a sound feature vector corresponding to the utterance in the conversation source data;
 identify a series of latent vectors based on the received conversation source data, wherein the series of latent vectors includes a latent vector corresponding to the utterance in the conversation source data;
 determine an attribution label associated with the utterance in the conversation source data;
 generate an encoder based on training, wherein the training is based on a combination of the determined attribution label, the identified series of latent vectors associated with the received conversation source data, and the generated series of sound feature vectors associated with the received conversation source data;
 generate a decoder based on training, wherein the training is based on a combination of the determined attribution label, the series of latent vectors associated with the received conversation source data, and the series of sound feature vectors associated with the received conversation source data;
 receive an input utterance;
 receive a target attribution label;
 reconstruct, based on a combination of the trained encoder and the trained decoder, a series of input sound feature vectors of the input utterance by estimating, using the trained encoder, a series of output latent vectors from intent latent vectors according to the target attribution label and by estimating, using the trained decoder, a series of the target sound feature vectors based on the estimated series of output latent vectors and the target attribution label;
 generate a target utterance based on the reconstructed series of input sound feature vectors; and
 provide the target utterance with the target attribution label.

16. The computer-readable non-transitory recording medium of claim 15, the computer-executable instructions when executed further causing the system to:
 generate the encoder and the decoder based on maximizing a value of an objective function,
  wherein the objective function at least relates to an error between the reconstructed series of input sound feature vectors and the generated series of sound feature vector, and
  wherein the objective function further relates to a distance between the determined series of output latent vectors and the identified series of latent vectors.

17. The computer-readable non-transitory recording medium of claim 15, wherein each of the encoder and the decoder is configured using one of: a convolutional network or a recurrent network.

18. The computer-readable non-transitory recording medium of claim 15, wherein the attribution of the conversation source data includes one or more of:
 gender of a speaker,
 a status of the speaker being a native speaker of a language used,
 a type of utterance mood of the speaker, or
 a style of utterance in lecture or non-lecture.

19. The computer-readable non-transitory recording medium of claim 15, the computer-executable instructions when executed further causing the system to:
 receive the input utterance for conversion;
 extract the series of input sound feature vectors from the input utterance.

20. The computer-readable non-transitory recording medium of claim 19,
 wherein the generated target utterance relates to converting non-language aspects of the input utterance while maintaining utterance sentences in the input utterance, and wherein the non-language aspects of the input utterance include one or more of individuality and an utterance style of a speaker.

* * * * *